United States Patent
Walter et al.

(10) Patent No.: US 7,207,613 B2
(45) Date of Patent: Apr. 24, 2007

(54) LUGGAGE AREA PROTECTION DEVICE FOR A MOTOR VEHICLE

(75) Inventors: Herbert Walter, Ebersbach (DE); Werner P. Schlecht, Vaihingen/Enz (DE)

(73) Assignee: Bos GmbH & Co. KG, Ostfildern (DE)

( * ) Notice: Subject to any disclaimer, the term of this patent is extended or adjusted under 35 U.S.C. 154(b) by 160 days.

(21) Appl. No.: 11/001,517

(22) Filed: Dec. 1, 2004

(65) Prior Publication Data

US 2005/0116486 A1 Jun. 2, 2005

(30) Foreign Application Priority Data

Dec. 2, 2003 (DE) ............................... 103 56 911

(51) Int. Cl.
*B60R 21/08* (2006.01)
(52) U.S. Cl. .................. 296/24.4; 296/37.16; 280/748; 280/749
(58) Field of Classification Search ............... 296/24.4, 296/24.43, 37.1, 37.16, 37.8; 280/748, 749
See application file for complete search history.

(56) References Cited

U.S. PATENT DOCUMENTS

| | | | | |
|---|---|---|---|---|
| 5,653,278 | A * | 8/1997 | Cheng .................. | 160/370.22 |
| 5,667,120 | A | 9/1997 | Bieck et al. | |
| 5,820,187 | A * | 10/1998 | Ament et al. ............ | 296/24.43 |
| 5,876,064 | A | 3/1999 | Ament et al. | |
| 5,971,433 | A * | 10/1999 | Ament et al. ................ | 280/749 |
| 6,325,436 | B1 * | 12/2001 | Ehrenberger et al. ...... | 296/24.4 |
| 6,349,986 | B1 | 2/2002 | Seel et al. | |
| 6,390,526 | B1 * | 5/2002 | Ament et al. ............ | 296/37.16 |
| 6,402,217 | B1 * | 6/2002 | Ament et al. ............ | 296/37.16 |
| 6,416,103 | B1 * | 7/2002 | Laudenbach et al. ...... | 296/37.1 |
| 6,491,332 | B2 * | 12/2002 | De Ceuster .............. | 296/37.16 |
| 7,017,965 | B2 * | 3/2006 | Sitzler et al. ............ | 296/24.43 |
| 7,021,692 | B2 * | 4/2006 | Laudenbach et al. ......... | 296/76 |
| 7,055,877 | B2 * | 6/2006 | Sparrer et al. ........... | 296/24.43 |
| 2001/0017194 | A1 * | 8/2001 | Schlecht et al. ........ | 160/370.22 |
| 2002/0163220 | A1 * | 11/2002 | Ament et al. ............ | 296/37.16 |
| 2004/0069424 | A1 | 4/2004 | Holger Seel | |

FOREIGN PATENT DOCUMENTS

| | | |
|---|---|---|
| AT | 00608501 | 4/2003 |
| DE | 19605907 | 8/1997 |
| DE | 19946382 | 4/2001 |
| EP | 0258823 | 3/1988 |
| WO | WO0238404 | 5/2002 |

OTHER PUBLICATIONS

European Patent Office Search Report dated Apr. 4, 2005 (3 pages).

* cited by examiner

*Primary Examiner*—D. Glenn Dayoan
*Assistant Examiner*—Greg Blankenship
(74) *Attorney, Agent, or Firm*—Flynn, Thiel, Boutell & Tanis, P.C.

(57) ABSTRACT

A luggage area protection device includes a flexible flat article movably arranged between a compactly deposited rest position and an extracted functioning position. At the front end in the extraction direction, a dimensionally stable extraction part, extending transversely to the flat article extraction position, is provided. Guides are associated with the extraction part and move the latter between the extracted functioning position and the flat article rest position. The extraction part is lockable in the extracted flat article functioning position.

Figure 1:
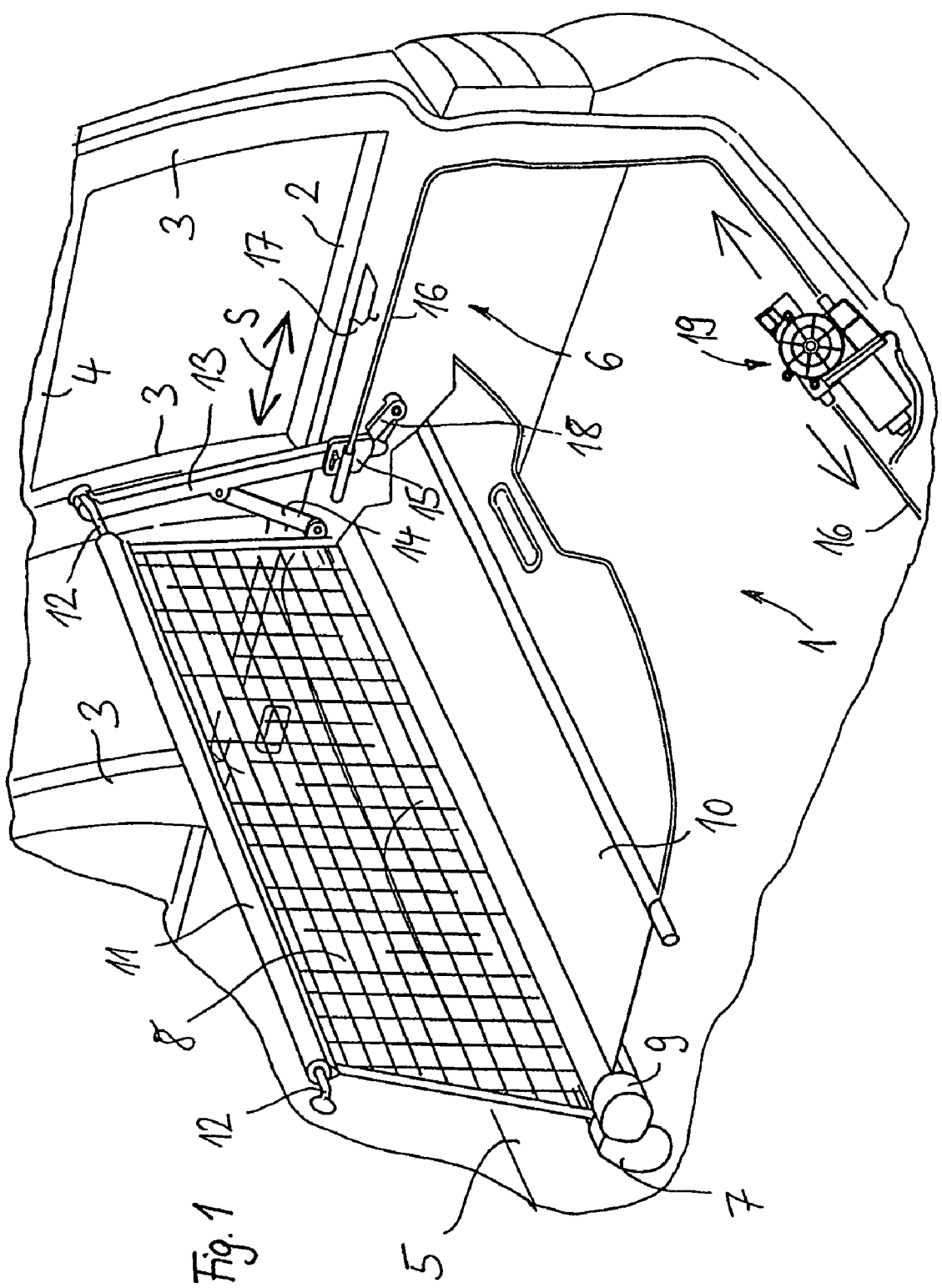

The locking mechanisms, considered in the flat article extraction direction, are positioned approximately at the same height or behind an area portion defining the rest position of the extraction part.

11 Claims, 4 Drawing Sheets

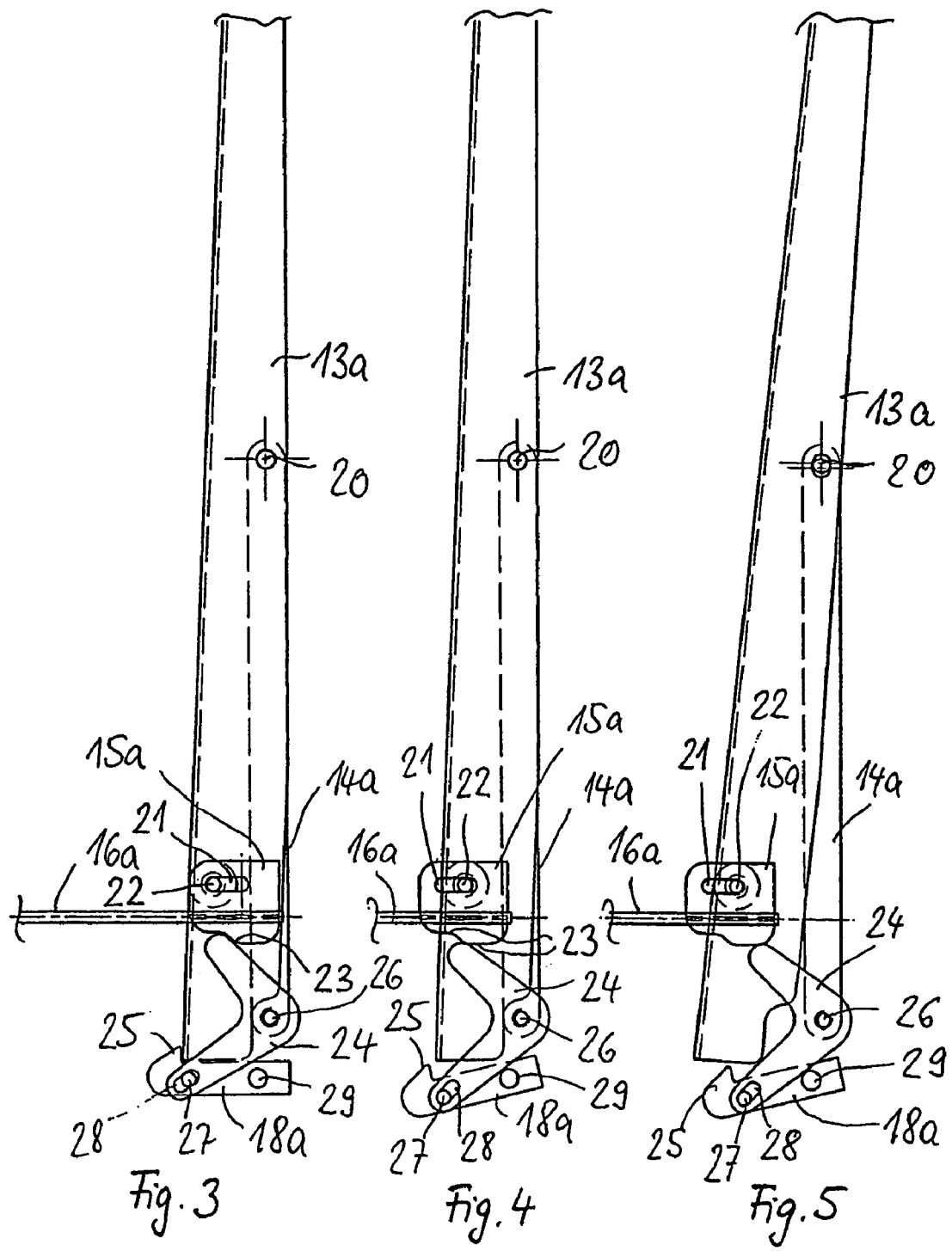

LUGGAGE AREA PROTECTION DEVICE FOR A MOTOR VEHICLE

The following disclosure is based on German Patent Application No. 10356911.1 filed on Dec. 2, 2003, which is herewith incorporated into this application by explicit reference.

BACKGROUND FOR THE INVENTION

The invention relates to a luggage area protection device for a motor vehicle having at least one flexible flat article, which is movably arranged between a compactly deposited rest position and an extracted functioning position and on whose front end region at the front in the extraction direction is provided a dimensionally stable extraction part extending transversely to the flat article extraction direction and where guidance means are associated with the extraction part which move the latter between the extracted functioning position and the flat article rest position and having securing means locking the extraction part in the extracted flat article functioning position.

Such a luggage area protection device in the form of a luggage area divider is known from DE 199 46 382 A1. In the case of the known luggage area divider a flexible flat article in the form of a dividing net is provided and held so as to be upwardly and downwardly windable on a winding shaft. The winding shaft is mounted in rotary manner in a magazine housing fixed in the luggage area in the vicinity of the back of a back seat rest arrangement. On a front end region at the front in the extraction direction the dividing net has an extraction ledge on which act in articulated manner two guide arms mounted on the magazine housing. The guide arms are operable by a drive unit and perform opposing, but mutually synchronized swivelling movements which bring about an extraction or insertion of the extraction ledge and consequently also the flat article. On its facing front sides the extraction ledge is provided with in each case one suspension hook. For the extracted functioning position of the dividing net with said suspension hooks is associated in the roof area a securing arrangement in the form of plug-in receptacles on facing roof struts, which secure the separating net in the extracted functioning position. By means of said plug-in or holding receptacles, the dividing net is securely held in its extracted functioning position, where it projects roughly vertically upwards, so that the dividing net can also fulfil a retaining function for pieces of luggage hurled around in the dividing net in the case of vehicle impact loads or other strong decelerations.

It is further known from DE 196 05 907 A1 to hold a dimensionally stable dividing structure in vertically displaceable manner by means of a sliding guide in the vicinity of a vehicle seat back rest arrangement. In a roof area are provided holding receptacles, which secure the dimensionally stable dividing structure in the upwardly slid functioning position if pieces of luggage are hurled against the dividing structure from the luggage area.

The problem of the invention is to provide a luggage area protection device of the aforementioned type permitting a secure retention of the flat article in its functioning position, independently of luggage area-side circumstances.

This problem is solved in that the securing means, considered in the flat article extraction direction, are positioned at least approximately at the same height or behind an area portion defining the rest position of the extraction part. The flat article can be constructed both as a luggage area divider extractable at least approximately in the vehicle vertical direction and as an at least approximately horizontally extractable luggage area cover. It is also possible to provide the flat article both as a luggage area divider and cover. Preferably in its rest position the extraction part is roughly level with a motor vehicle edge. Correspondingly the securing means are positioned at least approximately in this area. If the flat article is upwardly extractable the statement that the securing means are positioned behind an area portion defining the rest position of the extraction part means that the securing means are located below the extraction part. If the extraction part and therefore also the flat article are roughly horizontally extractable, the securing means are in a horizontal plane behind the area portion. The securing means serve to ensure the retention of the flat article and therefore the extraction part in the extracted functioning position where the flat article is fixed roughly vertically or roughly horizontally. This means that objects in the luggage area which can be hurled into the fixed, flexible flat article as a result of strong decelerations of the vehicle such as a vehicle impact or a strong braking function are reliably retained by the flat article. Due to the fact that the securing means are not located in a roof area or in a body column area of the motor vehicle, but are instead positioned in the vicinity of the area portion, the positioning of the luggage area protection device is independent of the body-side circumstances of the vehicle. This offers numerous area division possibilities for the vehicle interior. However, the desired retention function is more particularly achieved when designing the luggage area protection device as a luggage area divider. The compactly deposited rest position of the flat article can be implemented by winding onto a winding shaft or by a compact folding or sliding together in the manner of a curtain or the like. According to the invention it is possible to bring about an adequate retention function for the flat article in its extracted and in particular fixed functioning position without anchoring the extraction part on the vehicle side in corresponding holding receptacles. This obviates the need for vehicle-side holding receptacles, so that in particular in the body column and roof frame area and on the associated interior panels no precautions must be taken for the fitting of such holding receptacles. This leads to improved design possibilities for the vehicle interior and the interior panels.

According to a development of the invention the guidance means are mounted at least approximately at the same level or behind the area portion. The mounting of the guidance means is also preferably just below the vehicle edge if the area portion for the rest position of the extraction part is roughly in the vicinity of said vehicle edge. The term mounting of the guidance means is understood to mean the vehicle or luggage area-side mounting thereof. It is obviously also possible for the guidance means in the extracted functioning position of the extraction part to freely upwardly project over said area portion and therefore preferably over the vehicle edge.

According to a further development of the invention drive means are provided for operating the guidance means. The drive means are preferably constituted by an electrical drive unit, which moves the extraction part from the rest position of the flat article in the direction of the extracted functioning position. The electrical drive unit can also return the guidance means from the extracted functioning position back into the deposited rest position. However, it is also possible to provide a further drive in the form of a restoring drive, particularly a return spring, which mechanically returns the flat article to the compactly deposited rest position. Such a return spring is particularly advantageous if the flat article is held so as to be upwardly and downwardly windable on a winding shaft. The return spring in the form of a helical spring can be integrated into the winding shaft.

According to another development of the invention the guidance means have at least one guidance element which, at least during an extraction movement, acts on the extraction part and is mounted in translatory and/or rotary manner. Preferably, for this purpose a mechanical guidance element is provided, which can be constructed purely as a swivel arm, as a translatory movable telescopic arm or the like.

According to a further development of the invention the at least one guidance element is detachably connectable to the extraction part. It is in particular possible when not needed to remove the extraction part from the at least one guidance element and associate it with a guidance arrangement movable at right angles thereto. If the at least one guidance element transfers the extraction part and therefore the flat article into the vertical functioning position, the guidance arrangement which is to be alternatively associated with the extraction part can be used for transferring the flat article and therefore the extraction part into the roughly horizontal functioning position. In such an embodiment the flat article serves both as a luggage area divider and to prevent viewing of a luggage area below the vehicle edge and therefore as a luggage area cover.

According to a further development of the invention as guidance means are provided vertical displacement means, which displace the extraction part within the luggage area between a lower rest position and an upper extraction position where the extraction part is located in a roof region of the luggage area. This variant serves as a roughly vertically fixable luggage area divider.

According to another development of the invention the vertical displacement means have at least one sliding/swivelling linkage which is connected to a drive unit by means of a translatory movable tension/compression means and which is mounted in rotary stationary manner in such a way that a translatory movement of a fulcrum of the sliding/swivelling linkage connected to the tension/compression means leads to an erecting movement of a holding portion of the sliding/swivelling linkage, which is connected to the extraction part. This makes it possible to bring about a vertical extraction movement of the flat article through a horizontal drive movement.

According to another development of the invention the vertical displacement means have mechanical force transmission means, which transform a drive movement at right angles to a flat article extraction direction into an extraction movement in the extraction direction of the extraction part. Thus, a drive movement at right angles to the extraction movement is used for bringing about a corresponding, transversely directed extraction movement. Preferably the guidance of corresponding drive elements of the drive means is roughly horizontal and the corresponding extraction movement is at right angles thereto and therefore roughly vertical.

According to a further development of the invention on opposite sides of the extraction part engage in each case a vertical displacement means and synchronizing means are provided which control the drive means in such a way that the vertical displacement movements are movable at the same time and by the same path amounts. Thus, the extraction part can be displaced in parallel, so that over the entire flat article during the extraction movement a uniform tensile stress is applied over the entire width.

According to another development of the invention the securing means have at least one stationary locking member, which is associated with a support portion of the guidance means holding the extraction part in the extracted functioning position and mechanically locking in reliably retaining manner the support portion in the functioning position. The locking member preferably forms a counterload with respect to an application point of the extraction part on the support portion, relative to an imaginary fulcrum of the support portion on a luggage area-side vehicle part.

According to another development of the invention the locking member is movably mounted between a locking position and a release position. As a function of the position of the guidance means, this makes it possible to achieve locking or release.

According to a further development of the invention control means are provided, which transfer the locking member into the locking position or release it from the latter, as a function of the position of the guidance means. The control means are in particular mechanical and the locking member is preferably spring-loaded in at least one direction. It is also possible to construct the control means electromechanically, electromagnetically, electrically, electronically, pneumatically or hydraulically.

Further advantages and features of the invention can be gathered from the claims and the following description of preferred embodiments of the invention with reference to the attached drawings, wherein show:

FIG. 1 A perspective view of an embodiment of an inventive luggage area protection device for a motor vehicle.

Figure 2:
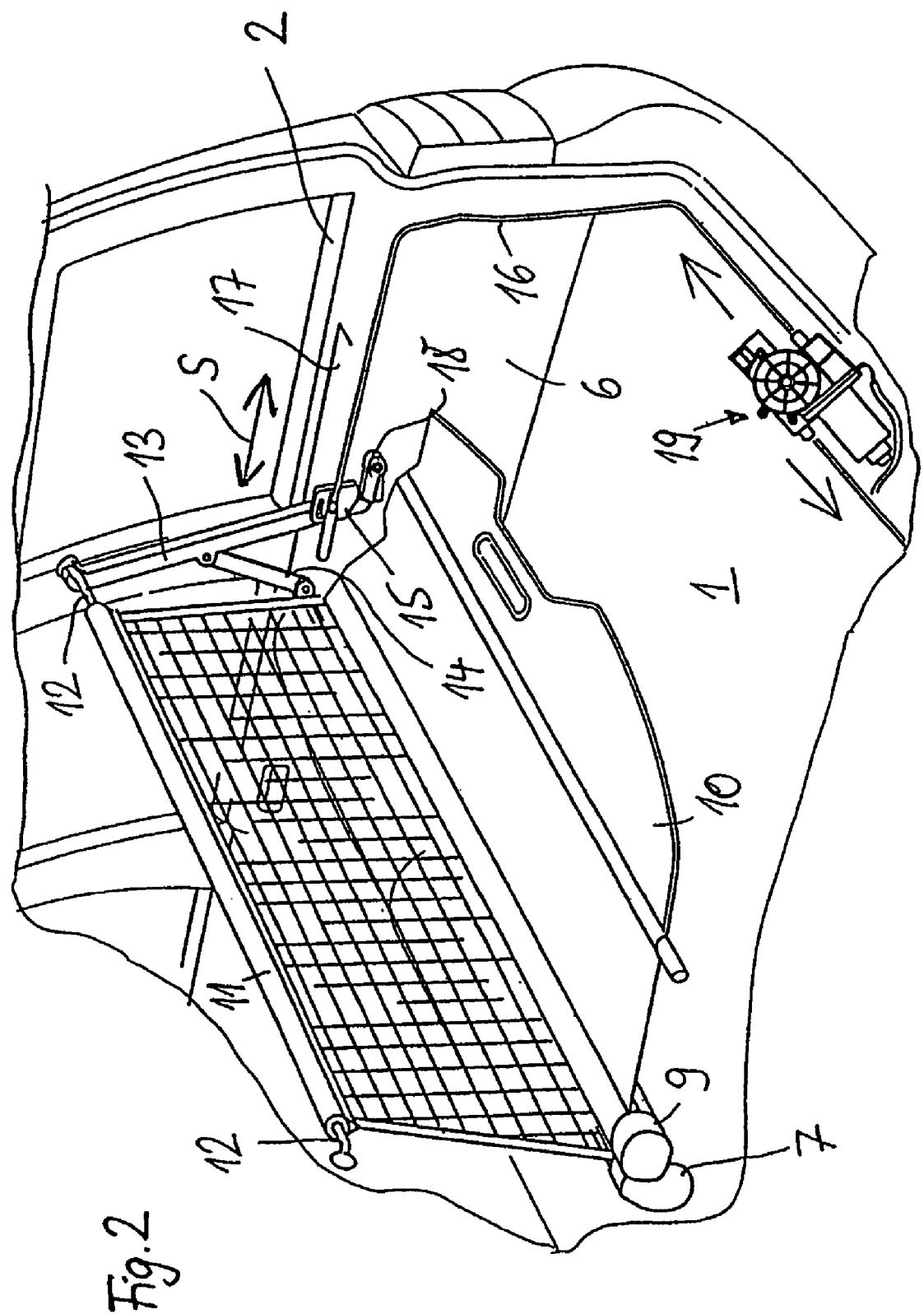

FIG. 2 The luggage area protection device of FIG. 1 in a slightly different movement position.

FIGS. 3 to 5 Vertical displacement means of a further luggage area protection device similar to FIGS. 1 and 2.

Figure 6:
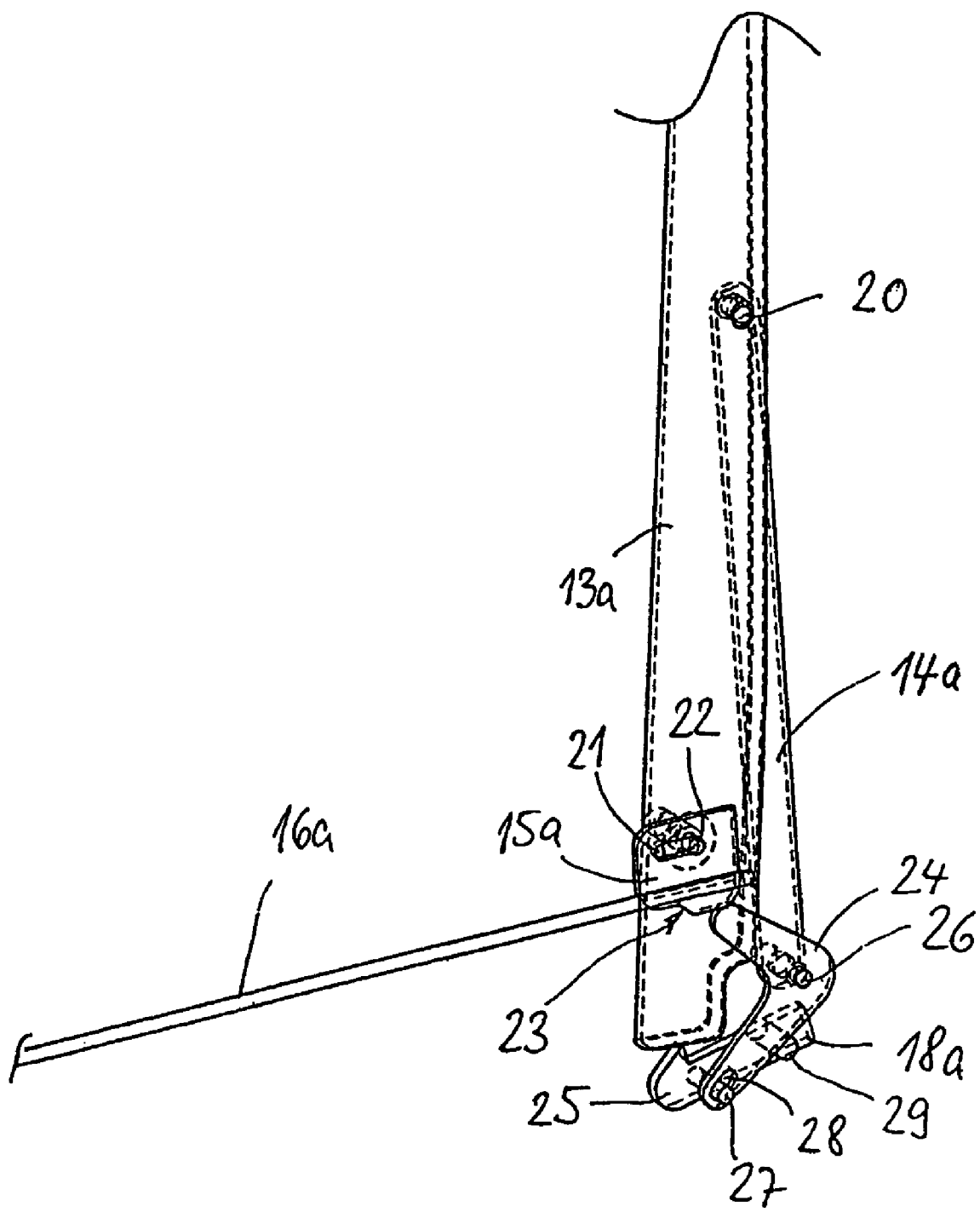

FIG. 6 The vertical displacement means of FIGS. 3 to 5 in a perspective view.

A motor vehicle in the form of a station wagon or stretched limousine has, as shown in FIGS. 1 and 2, a luggage area 1, which is located in the vehicle tail area and is bounded in the vehicle longitudinal direction in the forwards sense by an only diagrammatically represented back seat 5. On facing vehicle longitudinal sides the luggage area 1 is in each case enclosed by a side wall 6. On the tail side the luggage area 1 is bounded by a not shown, movable body part arrangement, particularly by a tailgate. The side walls 6 are formed by internal panel parts, which are connected to side regions of a body support structure of the vehicle. Up to a vehicle edge 2, the side walls 6 represent closed wall surfaces. Level with the vehicle edge 2, on facing vehicle sides are provided side window arrangements, which are separated from one another by several body columns 3 in the vehicle longitudinal direction. In the vehicle vertical direction the body columns 3 extend up to a roof region, indicated by a roof strut portion 4.

Roughly level with the vehicle edge 2 is provided on the back of a back seat arrangement 5 a magazine housing 7 in which is provided roughly horizontally and in the vehicle transverse direction a not shown winding shaft, which is rotatably mounted about a vehicle transverse axis in the magazine housing 7. On the winding shaft is held a flexible flat article, here in the form of a dividing net 8, which can be wound onto or off the winding shaft. In the winding on direction and in a not shown manner a return spring acts on the winding shaft and winds the dividing net 8 onto the latter within the magazine housing 7 and therefore transfers it into a compact rest position. The magazine housing 7 serves as a boundary of an area portion where the dividing net 8 is deposited in its rest position.

To the magazine housing 7 is fastened a second housing 9 for a horizontally extractable luggage area cover 10. This luggage area cover 10 is not decisive for the function of the dividing net 8 and the subsequently described luggage area protection device. The housing 9 can be detached from the magazine housing 7.

The dividing net 8 can be extracted into a functioning position illustrated in FIG. 1. In said functioning position the dividing net 8 is fixed roughly vertically and therefore in the vehicle vertical direction and extends over virtually the entire luggage area height above the vehicle edge 2 and over most of the vehicle interior width. On a front end of the dividing net 8 at the front in the extraction direction is located an extraction part 11 extending over the entire width of the front end region of the dividing net 8 and which is dimensionally stable. The extraction part 11 is preferably constructed as a metallic extraction rod or a metallic extraction ledge. On its facing front sides the extraction part 11 has in each case holding means in the form of a suspension hook 12. The entire width of the extraction part 11, which is dimensioned by the mutual spacing of the facing, external front sides of the two suspension hooks 12 is smaller than the spacing of the facing interior side portions of the vehicle interior level with the extraction part 11 in its extracted functioning position, so that also in the extracted functioning position of the extraction part 11 there is still a free space between the outer front faces of the suspension hooks 12 and the adjacent interior side portion. The extraction part 11 consequently extends in the extracted functioning position between the facing interior side portions of the vehicle interior. The interior side portions are in particular formed by internal panels of the body columns 3.

In order to transfer the extraction part 11 from the rest position, where the extraction part 11 in the vicinity of an extraction slot rests on the magazine housing 7, into the extracted functioning position of the dividing net 8 shown in FIG. 1, vertical displacement means to be described hereinafter are provided.

On both sides of the dividing net 8 the vertical displacement means have in each case sliding/swivelling linkages 13 to 15 and to facilitate understanding only the right-hand linkage in the normal movement direction is shown. The sliding/swivelling linkage comprises a dimensionally stable support arm 13 serving as a support portion and whose length in the embodiment shown slightly exceeds the maximum extraction length of the dividing net 8. The support arm 13 has a not designated holding receptacle in which can be releasably inserted the particular suspension hook 12. With the support arm 13 is associated as part of the sliding/swivelling linkage an erecting arm 14 serving as a force transmission means in the sense of the invention and which can be swivelled at a lower end and on the vehicle side in stationary manner about a swivelling axis in the vehicle transverse direction and at its facing front end is mounted in articulated manner about a parallel swivelling axis on the support arm 13. The erecting arm 14 engages over roughly half its length on the support arm 13. The support arm 13 with its end portion facing the holding receptacle is movable in translatory manner in the direction of double arrow S by means of a guidance member 15 in a longitudinal guide 17 running in the vehicle longitudinal direction. The length of the guide 17 is such that the support arm 13 can be moved from the functioning position of FIG. 1 into an almost flat position with respect to the tail area. The longitudinal guide 17 is integrated into the panelling of the side walls 6 and has an upwardly open elongated slot, whose width slightly exceeds the corresponding width of the support arm 13. The guidance member 15 runs in an almost completely concealed manner within the longitudinal guide 17. The guidance member 15 is movably mounted in the longitudinal guide 17 in an exclusively translatory manner in the vehicle longitudinal direction. As the lower end portion of the support arm 13 performs a swivelling movement in addition to the translatory movement, the support arm 13 is held by means of a guide pin not designated in FIGS. 1 and 2 in a linear connecting link guide of the guidance member 15 oriented in the vehicle longitudinal direction. The guidance member 15 is consequently linearly displaceably movable in the connecting link guide limits relative to the guide pin of the support arm 13, which is firmly connected to said support arm 13.

The guidance member 15 is moved in the vehicle longitudinal direction within the longitudinal guide 17 by a tension/compression means 16, which is operated by a drive unit 19 diagrammatically indicated in FIGS. 1 and 2. The drive unit 19 is provided with synchronizing means, which at the same time and by the same path amounts control both tension/compression means 16 on opposite sides of the dividing net 8.

As soon as the support arm 13 is moved forwards by the drive unit 19 and tension/compression means 16 from its not shown, almost flat rest position within the longitudinal guide 17, where the guidance member 15 is in its rear end position, the coupling with the erecting arm 14 necessarily brings about a raising of the support arm 13 with its front portion having the holding receptacle. This necessarily leads to the drawing upwards out of its rest position and in the vehicle vertical direction of the extraction part 11. Simultaneously the dividing net 8 is necessarily upwardly fixed.

To ensure that the dividing net 8 also fulfils a retention function for objects hurled out of the luggage area into said net, with the facing support arms 13 are associated securing means, here in the form of a locking member 18. Each locking member 18 is constructed as a swivellable latch and engages in the locking position shown in FIG. 1 behind a lower front end area of the lower end portion of the support arm 13. The locking member 18 is controlled by a control cam on a lower edge of the guidance member 15. The locking member 18 has two contour portions mutually offset in the vehicle transverse direction. The contour portion on the inside towards the centre of the luggage area serves as a control part for the control cam of the guidance member 15. The outer contour portion serves as a latch portion, because it locks the support arm 13 in the locking position. The locking member 18 is spring-loaded towards its locking position by a not shown spring arrangement. The contour portion of the locking member 18 serving as a control part is provided with a lifting bevel in such a way that in the case of a movement of the guidance part 15 towards the tail region of the luggage area 1, the locking member 18 is necessarily pressed downwards, so that the latch portion releases the end portion of the support arm 13. The relative mobility of the guidance part 15 with respect to the support arm 13 allows the desired control movement, because the guidance member 15 can be moved in translatory manner over the length of the connecting link guide, although the support arm 13 is locked by the locking member 18. Thus, a retraction of the guidance member 15 brings about a downward control of the locking member 18, so that the support arm 13 is freed for a rearward movement. The release position for the support arm 13 is shown in FIG. 2.

In a not shown embodiment of the invention the luggage area cover is removed. The dividing net 8 is made from a more view-tight material than the net according to FIGS. 1 and 2. This not shown dividing net can be used as a luggage area cover in addition to its function as an upwardly fixed luggage area divider. For this purpose and in simple manner the dividing net in the retracted rest position of the extraction part is disengaged from the holding receptacles of the support arms and extracted roughly horizontally rearwards towards the tail region. In the tail region and in simple manner can be provided luggage area-side holding receptacles in which can be suspended the suspension hooks. It is fundamentally also possible to perform the extraction movement to the luggage area cover rearwards and in fully automatic manner. In such a variant the suspension hooks are suspended in horizontally movable guidance means of a further drive unit, which extract the extraction part and therefore the flat article towards the tail region.

The embodiment according to FIGS. 3 to 6 discloses vertical displacement means, which as regards the basic construction correspond to the embodiment of FIGS. 1 and 2. Functionally identical parts are given the same reference numerals, accompanied by the addition of the letter a. The essential difference is the modified design of the securing means. The securing means according to FIGS. 3 to 6 also have for each support arm 13*a* a locking member 18*a*, which is pivotably mounted about a swivelling axis 29. The locking member 18 is constructed in the manner of a latch and has a detent 25, which in the locking position engages behind a lower marginal area of the support arm 13*a* (FIG. 3). Also in this embodiment a movement of the support arm 13*a* is firstly brought about by a translatory movable guidance member 15*a* and secondly by an erecting arm 14*a*. The guidance member 15*a* is linearly moved by a tension/compression means 16*a*. The guidance member 15*a* has a connecting link guide 21 in the form of an elongated slot which runs parallel to the movement direction of the tension/compression means and in which is located in relatively displaceable manner a guidance pin 22 of the support arm 13*a*. At its lower end the guidance member 15*a* has a control cam 23 which, unlike in the embodiment according to FIGS. 1 and 2, does not act directly on the locking member 18*a*, but instead on a L-shaped transmission lever 24, which is swivellably mounted about the lower swivelling axis of the erecting arm 14*a*. The transmission lever 24 is spring-loaded clockwise in FIGS. 3 to 5 by a not shown leg spring, so that one lever leg is permanently pressed against the control cam 23 of the guidance member 15*a*. The other leg of the transmission lever 24 is connected by means of a slot guide 28 with a control pin 27 of the locking member 18*a*. The described kinematics brings about the same functions as in the embodiment according to FIGS. 1 and 2.

As soon as the guidance member 15*a* is drawn rearwards from the locking position of the locking member 18*a* according to FIG. 3 by means of the tension/compression means 16*a*, a corresponding lifting bevel of the control cam 23 brings about a downward deflection of the transmission lever 24. Thus, the locking member 18*a* is also swivelled downwards, so that the detent 25 releases support arm 13*a*. The guidance pin 22 now strikes against the front end of the connecting link guide 21 of the guidance member 15*a*, so that the latter during a further rearward longitudinal movement necessarily also moves the support arm 13*a* rearwards. As a result of the rearward swivelling of the erecting arm 14*a*, the support arm 13*a* now performs a controlled, gradual lowering movement as in the embodiment according to FIGS. 1 and 2. The further erection of the support arm 13*a* and therefore the transfer of the extraction part and the dividing net into the extracted functioning position takes place in a correspondingly reversed order.

In a not shown embodiment of the invention the extraction part 11 and the two support arms flanking the dividing net on facing sides are interconnected to form an integral frame part. Otherwise this embodiment corresponds to the embodiments of FIGS. 1 to 6.

The invention claimed is:

1. Luggage area protection device for a motor vehicle with at least one flexible flat article movably positioned between a compactly deposited rest position and an extracted functioning position and on whose front end region at the front in the extraction direction is provided a dimensionally stable extraction part, which extends transversely to the extraction direction of the flat article and with said extraction part are associated guidance means, which move the extraction part between the extracted functioning position and the rest position of the flat article, and having securing means locking the extraction part in the extracted functioning position of the flat article, wherein the securing means, considered in the extraction direction of the flat article, are positioned at least approximately at the same height or behind an area portion defining the rest position of the extraction part, wherein as guidance means are provided vertical displacement means which move the extraction part within the luggage area between a lower rest position and an upper extraction position in which the extraction part is positioned in a roof region of the luggage area, wherein the vertical displacement means have mechanical force transmission means, which transform a driving movement at right angles to an extraction direction of the flat article into an extraction movement of the extraction part in the extraction direction.

2. Luggage area protection device according to claim 1, wherein the guidance means are mounted at least approximately at the same height or behind the area portion.

3. Luggage area protection device according to claim 1, wherein drive means are provided for operating the guidance means.

4. Luggage area protection device according to claim 2, wherein the guidance means have at least one guidance element which, at least during an extraction movement, acts on the extraction part and is mounted in translatory and/or rotary manner.

5. Luggage area protection device according to claim 4, wherein the at least one guidance element is detachably connectable to the extraction part.

6. Luggage area protection device according to claim 1, wherein on each of opposite sides of the extraction part acts vertical displacement means and wherein synchronizing means are provided which control drive means in such a way that the vertical displacement means are movable at the same time and by the same path amounts.

7. Luggage area protection device for a motor vehicle with at least one flexible flat article movably positioned between a compactly deposited rest position and an extracted functioning position and on whose front end region at the front in the extraction direction is provided a dimensionally stable extraction part, which extends transversely to the extraction direction of the flat article and with said extraction part are associated guidance means, which move the extraction part between the extracted functioning position and the rest position of the flat article, and having securing means locking the extraction part in the extracted functioning position of the flat article, wherein the securing means, considered in the extraction direction of the flat article, are positioned at least approximately at the same height or behind an area portion defining the rest position of the extraction part, wherein the securing means have at least one stationary mounted locking member, which is associated with a support portion of the guidance means holding the extraction part in the extracted functioning position and mechanically locking the support portion so that it is reliably retained in the functioning position.

8. Luggage area protection device according to claim 7, wherein the locking member is movably mounted between a locking position and a release position.

9. Luggage area protection device according to claim 8, wherein control means are provided, which transfer the locking member into the locking position or release position as a function of the position of the guidance means.

10. Luggage area protection device according to claim 7, wherein as guidance means are provided vertical displacement means which move the extraction part within the luggage area between a lower rest position and an upper extraction position in which the extraction part is positioned in a roof region of the luggage area.

11. Luggage area protection device for a motor vehicle with at least one flexible flat article movably positioned between a compactly deposited rest position and an extracted functioning position and on whose front end region at the front in the extraction direction is provided a dimensionally stable extraction part, which extends transversely to the extraction direction of the flat article and with said extraction part are associated guidance means, which move the extraction part between the extracted functioning position and the rest position of the flat article, and having securing means locking the extraction part in the extracted functioning position of the flat article, wherein the securing means, considered in the extraction direction of the flat article, are positioned at least approximately at the same height or behind an area portion defining the rest position of the extraction part, wherein as guidance means are provided vertical displacement means which move the extraction part within the luggage area between a lower rest position and an upper extraction position in which the extraction part is positioned in a roof region of the luggage area, wherein the vertical displacement means have at least one sliding/swivelling linkage, which is connected by means of a translatory movable tension/compression means to a drive unit and which is mounted in rotary stationary manner in such a way that a translatory movement of a fulcrum of the sliding/swivelling linkage connected to the tension/compression means leads to an erecting movement of a holding portion of the sliding/swivelling linkage connected to the extraction part.

* * * * *